Oct. 27, 1959  J. G. INGRES  2,910,048
BOOSTER BRAKE MECHANISM
Filed June 5, 1958  2 Sheets-Sheet 1
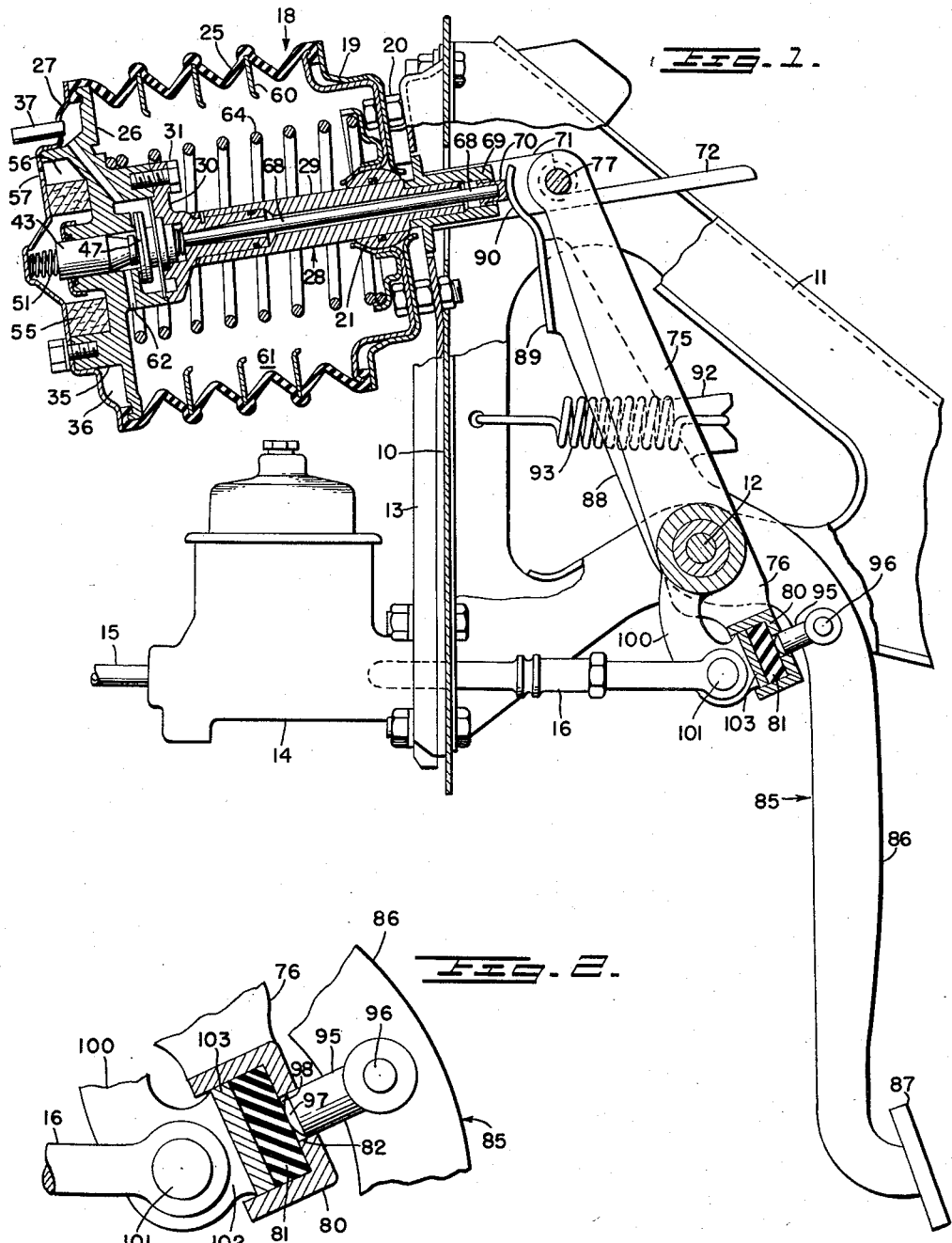
INVENTOR.
JEANNOT G. INGRES
BY
John F. Phillips
ATTORNEY Oct. 27, 1959  J. G. INGRES  2,910,048
BOOSTER BRAKE MECHANISM
Filed June 5, 1958  2 Sheets-Sheet 2
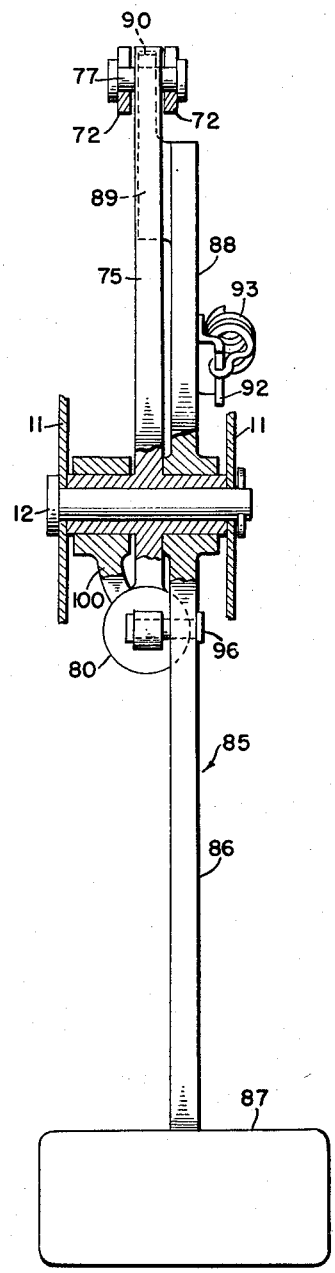
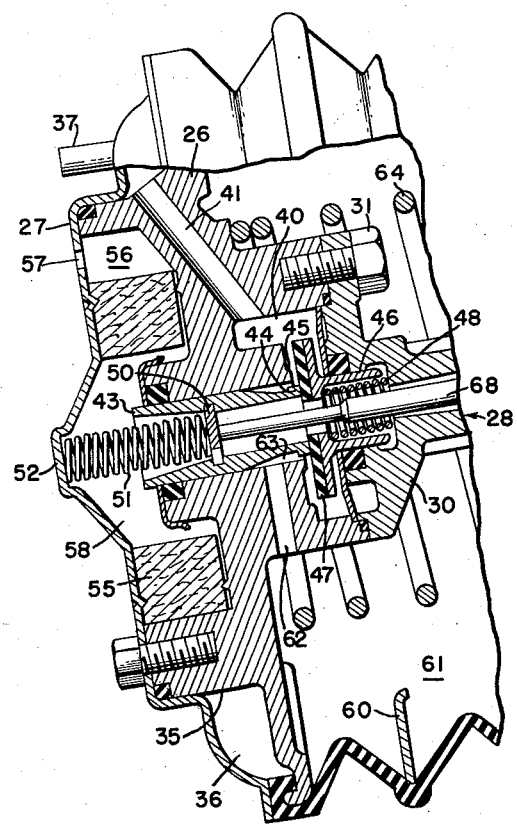
INVENTOR.
JEANNOT G. INGRES
BY
ATTORNEY

United States Patent Office 2,910,048
Patented Oct. 27, 1959

2,910,048
BOOSTER BRAKE MECHANISM
Jeannot G. Ingres, Dearborn, Mich., assignor to Kelsey-Hayes Company, Detroit, Mich., a corporation of Delaware
Application June 5, 1958, Serial No. 740,021
15 Claims. (Cl. 121—41)

This invention relates to a booster brake mechanism and is an improvement over the structure of the prior patent of David T. Ayers, Jr., No. 2,791,203, granted May 7, 1957.

In the prior patent referred to, there is disclosed a novel type of power brake operating mechanism wherein a bellows motor is arranged forwardly of the vehicle fire wall above a conventional master cylinder. The movable wall of the motor is connected to a power lever and the valve mechanism for the motor is controlled by a pedal lever, the two levers being so related as to combine in delivering their force to the master cylinder plunger. Unlike prior constructions, the follow-up valve mechanism for the motor is biased toward operative position to move to such position upon operation of the pedal lever, the latter being biased to a normal position by spring means stronger than the biasing means which tends to move the valve mechanism toward operative position.

An important object of the present invention is to provide a booster brake mechanism of the type referred to, wherein there is provided a novel cooperative relation between the pedal lever and power lever and wherein a deformable low durometer body is employed for transmitting forces from the two levers to the master cylinder plunger.

A further object is to provide such an apparatus wherein the pedal lever is initially movable from off position against slight resistance, thereby providing a soft initial pedal, and wherein further movement of the pedal causes means carried thereby to engage a low durometer deformable body interposed between the pedal lever and the master cylinder piston and through which body pedal lever and power lever forces are transmitted to the master cylinder plunger.

A further object is to provide a novel arrangement of the parts referred to wherein the deformable body is directly carried by the power lever for transmitting forces therefrom to the master cylinder plunger, and wherein such deformable body is engageable by means carried by the pedal lever to be deformed during initial movement thereof to a limited extent, after which pedal lever forces also are transmitted to the master cylinder plunger.

Other objects and advantages of the invention will become apparent during the course of the following description.

In the drawings I have shown one embodiment of the invention. In this showing:

Figure 1 is a side elevation of the apparatus, parts being shown in section, and with all of the parts illustrated in their normal off positions;

Figure 2 is an enlarged fragmentary sectional view through the deformable member and the parts associated therewith;

Figure 3 is an edge elevation of the lever mechanism, parts being shown in section; and Figure 4 is an enlarged fragmentary sectional view of the end of the motor containing the valve mechanism, such mechanism being shown in motor energizing position.

Referring to Figure 1, the numeral 10 designates the fire wall of a motor vehicle to the rear face of which is secured a bracket 11 of conventional type, and such bracket carries a pivot pin 12 for supporting the lever mechanism forming the principal subject matter of the present invention. Forwardly of the fire wall 10 is secured a bracket 13 and a conventional master cylinder 14 is bolted to this bracket and to the fire wall 10. The master cylinder is provided with an outlet duct 15 connected to the vehicle brake cylinders in the usual manner. The plunger (not shown) of the master cylinder is conventional and is operable by a push rod 16.

The source of power for the mechanism comprises a motor indicated as a whole by the numeral 18 and comprises a stationary head structure 19 bolted as at 20 to the bracket 13 with its axis inclined from the horizontal as shown. This head structure carries a rockable hemispherical bearing 21 for a purpose to be described.

The motor 18 further comprises a bellows 25 fixed at its forward end to the stationary head structure 19. The forward end of the motor is provided with a preferably die-cast head 26, and the forward end of the bellows 25 is clamped between such head and a preferably stamped sheet metal cap 27 further described below. A generally tubular piston rod 28 comprises axially engaged sections 29 and 30, the former of which is slidable through the bearing 21. The forward end of the piston rod section 30 is flanged and attached by screws 31 to the movable head 26.

The cap 27 has a portion fitting around an annular flange 35 formed on the head 26 and, outwardly of such flange, the cap 27 cooperates with the head 26 to form an annular vacuum chamber 36 having a tubular nipple 37 adapted for connection with a pipe line leading to a source of vacuum such as the intake manifold of the vehicle.

The head 26 has formed therein a vacuum chamber 40 communicating with the chamber 36 through a duct 41. It will be apparent, therefore, that vacuum is always present in the chamber 40.

A tubular valve seat member 43 is axially slidable in the head 26, as clearly shown in Figure 4, and has at its rear end an annular valve seat 44 arranged inwardly of a similar valve seat 45 formed on the body 36. An axially slidable valve member 46 is mounted in the piston rod section 30 and has fixed against its forward face a resilient valve 47 normally engaging the seat 45 and normally disengaged from the seat 44. The valve 47 is biased toward the valve seats referred to by a spring 48.

Within the valve seat member 43 is fixed a stop member 50 apertured as shown for the passage of air through the valve seat member. A spring 51 is engaged at its rear end against the member 50 and at its forward end against the axially extended portion 52 of the cap member 27. The spring 51 is stronger than the spring 48 and in the absence of a stronger biasing means to be referred to, the spring 51 will overcome the spring 48 to move the parts of the valve mechanism to the motor energizing positions shown in Figure 4.

An annular air cleaner 55 is arranged in the cap 27 and is supplied with air from a radially outer chamber 56 open to the atmosphere as at 57. The space 58 within the air cleaner obviously, therefore, forms an air chamber open at all times to the interior of the valve seat member 43.

The bellows 25 is preferably provided with stiffening ribs 60 to prevent the collapsing thereof upon the exhaustion of air from the motor chamber 61 formed within the bellows, such air being exhausted through a passage 62 connected between the motor chamber 61 and an annular space 63 formed around the rear end of the valve seat member 43. The movable head is biased to the normal off position shown in Figure 1 by a return spring 64.

A push rod 68 extends through the piston rod 28 and has its forward end engaging against the stop member 50 as shown in Figure 4. The rear end of this push rod extends through a head 69 axially fitted on the rear end of the piston rod member 29. A button 70 is slidable in the head 69 and is mounted on the adjacent end of the push rod 68. The head 69 is provided with a rearwardly extending bifurcated portion 71, from which extend rearwardly fingers 72 (Figures 1 and 3) for a purpose to be described.

The lever mechanism comprises a power lever 75 mounted for turning movement on the pivot pin 12 and having an end 76 extending therebelow. The upper end of the power lever extends between the fingers 72 and engages against the bifurcated portion 71 of the head 69. Movement of this head incident to operation of the motor, therefore, moves the pin 77 toward the right in Figure 1, while this pin obviously is free to move independently of the head 69 in the event of a failure of power in the motor.

The lower lever end 76 carries a cup 80 (Figures 1, 2 and 3) in which is arranged a low durometer resilient body 81 substantially filling the diameter of the cup 80, as clearly shown in Figure 2. The base of the cup 80 is provided with an axial opening 82 for a purpose to be described.

A pedal lever indicated as a whole by the numeral 85 is mounted for turning movement on the pivot pin 12, such pin constituting the only means necessary for supporting the two levers 75 and 85. The pedal lever comprises a lower lever arm 86 carrying a conventional pedal pad 87, and further comprises an upper lever arm 88. The upper end of the lever arm 88 is provided with a portion extending laterally as at 89, and such portion of the lever arm 88 is provided with an upward extension 90 projecting between the bifurcated ends 71. Such end 90 of the lever arm 88 is curved as shown in Figure 1 and engages against the button 70. Intermediate its ends, the upper arm 88 of the pedal lever is provided with an extension 92 to which is connected one end of a spring 93, the other end of this spring being connected to the bracket 11 as shown in Figure 1. The spring 93 normally overcomes the spring 51 to retain the valve mechanism in the normal off position shown in Figure 1.

The lower pedal lever arm 86 is provided with a generally forwardly extending finger 95 pivoted thereto as at 96 and extending through the opening 82 (Figure 2). The extremity of the finger 96 is preferably formed as a section of a sphere as at 97, the axial portion of such end preferably being arranged in light contact with the adjacent surface of the deformable body 81, or in close proximity thereto. The curvature of the end 97 provides an annular space 98 for the deformation of some of the body 81 upon initial operation of the pedal lever 85, as described below.

A supporting arm 100 is also mounted on the pivot pin 12 and depends therefrom, and is pivotally connected as at 101 to the rear end of the master cylinder push rod 16. A rearward extension 102 on the arm 100 carries a plate 103 having an easily sliding fit with the interior of the cup 80 and having its rear face engaging the adjacent face of the deformable body 81.

*Operation*

The parts of the apparatus occupy the normal positions shown in Figure 1. The spring 93, being stronger than the spring 51, maintains the upper end of the lever 88 at its extreme left-hand position shown in Figure 1 to transmit, through the push rod 68, a force which maintains the seat 44 disengaged from the valve 47. Under such conditions, the spring 48, which is weaker than the spring 51, is free to maintain the valve 47 on the seat 45. The motor chamber 61 thus is in communication with the atmosphere through passage 62 and space 63, around the valve seat 44 and through the interior of the valve seat member 43, which is always in communication with the air chamber 58.

When the brakes are to be applied, the operator will depress the pedal 87, thus turning the pedal lever 85 clockwise about the pivot pin 12. Initial movement of the pedal lever takes place solely against the tension of the spring 93. The tension of this spring and the leverage provided for overcoming it is such that very little force need be applied to the brake pedal, and accordingly a "soft" pedal is provided. The lever arm 86 moves to the left, carrying with it the finger 95. This finger moves into engagement with the low durometer deformable body 81, this material being so soft that it is very freely deformable into the space 98 (Figure 2). Accordingly, little initial force is required to deform the member 81. As this action takes place, the finger 90 at the upper end of the lever arm 88 will be moving toward the right in Figure 1, thus relieving pressure between the push rod 68 and member 50. The spring 51 causes the valve seat member 43 to follow the withdrawal of the rod 68 and, when the valve seat 44 engages the resilient valve 47, the valve parts will be in lap position. As the rod 68 is further withdrawn, the member 43, engaging the valve 47, will move such valve away from the seat 45, thus "cracking" the chamber 40 to the space 43. Since this space is always in communication with the motor chamber 61, while the chamber 40 is always in communication with the vacuum source, air will be exhausted from the motor chamber 61 and air pressure acting against the left-hand end of the motor in Figure 1 will cause the head 26 to move toward the right, thus transmitting force to the power lever 75 through the pin 77.

The action just described imparts turning movement in a clockwise direction to the power lever 75, and the lower end 76 of this lever will move to the left as viewed in Figure 1 to transmit force through the pin 101 to the push rod 16 to operate the master cylinder plunger. Such operation tends to move the resilient body 81 away from the finger 95, and to continue the operation referred to, it is necessary for the operator to continue to depress the pedal pad 87. Assuming that the operator continues to depress the brake pedal to maintain the deformable body 81 deformed to its maximum extent as determined by the capacity of the space 98, the body 81 no longer will be deformable, and being incompressible, forces will be transmitted to the pin 101 wholly through the resilient body 81. Part of such force will be transmitted from the lower lever arm 76 and part will be transmitted from the pedal lever through finger 95. Both the motor and pedal lever therefore perform their proportionate share of the work necessary for operating the master cylinder, and any desired ratio between these forces may be provided according to the design of the various lever arms involved, as will be obvious.

Assuming that the pedal pad is depressed to a predetermined extent for a moderate brake application and its movement is then arrested, a slight further movement of the movable motor head 26 will impart slight further movement to the power lever 75. The lower lever arm 76 thereupon moves slightly to the left of the position which it occupied when brake pedal movement was arrested, and since the valve controlling finger 90 (Figure 1) will now be stationary, such slight additional movement of the motor head 26 will cause the rod 68 to prevent further movement of the valve seat member 43, whereupon the seat 45 will engage the valve 47 and the valve parts will assume lap position. Further activation of the motor will be arrested at such point.

Throughout normal brake applications, it will be apparent that the simple single deformable body 81 acts to transmit all operating forces to the master cylinder plunger, and such resilient body obviously transmits reaction forces through the finger 95 to the pedal lever 85 to provide the pedal pad 87 with direct reaction from the master cylinder. As previously stated, the body 81 is not compressible, and after it has reached its point of maximum deformation, the operator can continue to apply any desired forces from the pedal lever 85 to the master cylinder plunger. This application of force may take place after the point of maximum energization of the motor has been reached, and thus it will be apparent that the maximum application of the brakes will depend upon the ability of the operator in applying forces to the pedal pad 87.

In the operation of the parts as described above it will be apparent that the single pivot pin 12 is all that is necessary to support both the pedal lever and the power lever and also the supporting arm 100. This arm supports the pivot pin 101 and carries the plate 103 against which the resilient body 81 delivers its force to effect movement of the master cylinder plunger.

In the event of a failure of power for the motor 18, the brakes may be applied solely by pedal lever force. Depression of the pedal lever will cause the finger 95 to deform the body 81 to the maximum extent, after which the member 81 acts as a force transmitting element between the pedal lever and the master cylinder push rod for the pedal application of the brakes. The application of such forces, of course, will swing the power lever 75 in a counterclockwise direction. However, the pin 77 will move freely to the left along the fingers 72, and no force exerted by the operator will be expended in compressing the motor return spring 64.

It will be apparent that the present apparatus represents a simplification of the structure shown in the prior patent identified above, it being unnecessary to provide one pivot pin for supporting one of the levers and a second pivot pin for connecting the two levers to each other. The single pivot pin 12 constitutes the sole means for connecting the entire lever mechanism to the bracket 11. The use of the single simple deformable low durometer body 81 provides an efficient power transmitting means between the two sources of master cylinder plunger operating forces, namely, the power lever and the pedal lever, and a very smooth "lumpless" operation of the brakes is provided. The "feel" in the brake pedal is extremely smooth, including the progressive building-up of reaction forces from the master cylinder plunger to the pedal lever 85.

It is to be understood that the form of the invention shown and described is to be taken as a preferred example of the same and that various changes in the shape, size, and arrangement of the parts may be made as do not depart from the spirit of the invention or the scope of the appended claims.

I claim:

1. A booster brake mechanism comprising a master cylinder operating rod, a fluid pressure motor having a movable wall at one side of which is formed a variable pressure chamber, a valve mechanism having a normal position connecting said chamber to one source of pressure and movable to connect it to a source of different pressure to operate said movable wall, a power lever connected to said movable wall, a pedal lever connected to said valve mechanism, and a deformable body of material engaging said operating rod and said power lever and engageable with said pedal lever upon movement thereof to operate said valve mechanism whereby forces are delivered to said rod through said body from both of said levers.

2. A booster brake mechanism comprising a master cylinder operating rod, a fluid pressure motor having a movable wall at one side of which is formed a variable pressure chamber, a valve mechanism having a normal position connecting said chamber to one source of pressure and movable to connect it to a source of different pressure to operate said movable wall, a power lever connected to said movable wall, a pedal lever connected to said valve mechanism, a cup carried by said power lever, and a body of deformable material in said cup, a portion of said pedal lever projecting into said cup in engagement with said body of material, said rod, said cup and said portion of said lever completely confining said body of material except for a limited expansion space to receive said material upon operation of said pedal lever, whereby, upon operation of said pedal lever to deform said body, said valve mechanism will operate to connect said chamber to said other source and forces will be transmitted from said cup and said portion of said pedal lever through said body to said rod.

3. A booster brake mechanism comprising a master cylinder operating rod, a fluid pressure motor having a movable wall at one side of which is formed a variable pressure chamber, a valve mechanism having a normal position connecting said chamber to one source of pressure and movable to connect it to a source of different pressure to operate said movable wall, a power lever connected to said movable wall, a pedal lever connected to said valve mechanism, a cup carried by said power lever, a body of a highly deformable material in said cup, a force transmitting member carried by said rod and slidable in said cup in engagement with said body of material, a portion of said pedal lever projecting into said cup from the side thereof opposite said force transmitting member and engageable with said body of material, said force transmitting member, said cup and said portion of said pedal lever confining said body of material except for a limited expansion space into which said material is deformable upon operation of said pedal lever whereby, upon operation of said pedal lever to deform said body, said valve mechanism will operate to connect said chamber to said other source and forces will be transmitted from said cup and said portion of said pedal lever through said body of material to said force transmitting member to operate said rod.

4. A booster brake mechanism comprising a master cylinder operating rod, a fluid pressure motor having a movable wall at one side of which is formed a variable pressure chamber, a valve mechanism having a normal position connecting said chamber to one source of pressure and movable to connect it to a source of different pressure to operate said movable wall, a power lever and a pedal lever pivotally supported intermediate their ends, corresponding ends of said power lever and said pedal lever being connected respectively to said movable wall and to said valve mechanism, and a deformable body of material between and engaging said operating rod and the other end of said power lever and engageable with a portion of the other end of said pedal lever upon movement theerof to operate said valve mechanism whereby forces are delivered to said rod through said body from said other ends of both of said levers.

5. A mechanism according to claim 4 wherein said deformable body of material is carried by said other end of said power lever, said body of material being substantially confined by a portion of said power lever, by said rod and by said portion of said pedal lever except for a limited expansion space into which said material is deformable upon movement of said other end of said pedal lever from a normal off position.

6. A mechanism according to claim 4 wherein said other end of said power lever is provided with a cup having an open end facing toward said operating rod and in which said body of material is arranged, and a force transmitting member carried by said rod in said open end of said cup in engagement with said body of material, said portion of said pedal lever engaging said body of material comprising an element projecting into said cup from the other end thereof.

7. A booster brake mechanism comprising a master cylinder operating rod, a fluid pressure motor having a movable wall at one side of which is formed a variable pressure chamber, a valve mechanism for said motor having a normal position connecting said chamber to one source of pressure and movable to connect it to a source of different pressure to operate said movable wall, a power lever and a pedal lever, a fixed pin pivotally supporting said levers intermediate their ends, corresponding ends of said power lever and said pedal lever being connected respectively to said movable wall and to said valve mechanism, and a highly deformable body of material arranged between and engaging said operating rod and the other end of said power lever and engageable with a portion of the other end of said pedal lever, said operating rod, a portion of said power lever and said portion of said pedal lever substantially confining said body of material except for a limited space into which said body of material is deformable upon movement of the other end of said pedal lever to operate said valve mechanism whereby, upon operation of said pedal lever to deform said body, said valve mechanism will operate to connect said chamber to said other source and forces will be transmitted from said other ends of both of said levers through said body to said operating rod.

8. A mechanism according to claim 7 wherein said other end of said power lever is provided with a cup having an open end facing toward said operating rod and in which said body of material is arranged, said operating rod having a member carried thereby and fitting in said open end of said cup in engagement with said body of material, said portion of said pedal lever comprising an element projecting into said cup from the other end thereof.

9. A booster brake mechanism comprising a master cylinder operating rod, a fluid pressure motor arranged above said rod and having a movable wall at one side of which is formed a variable pressure chamber, a valve mechanism having a normal position connecting said chamber to one source of pressure and movable to connect it to a source of different pressure to operate said movable wall, a power lever and a pedal lever each having upper and lower ends, a fixed pivot pin pivotally supporting both levers between said ends thereof, said pivot pin being arranged between said operating rod and said motor, the upper ends of said power and pedal levers being connected respectively to said movable wall and to said valve mechanism, a body of highly deformable material carried by the lower end of said power lever and engaging at one side thereof with said operating rod, and means carried by said pedal lever and engageable with the other side of said body of material to deform the latter upon movement of said pedal lever from a normal off position, said rod, said lower end of said power lever and said means combining to confine said body of material except for a limited space for receiving said material upon deformation thereof by movement of said pedal lever to operate said valve mechanism whereby, upon energization of said motor, said body of material will transmit forces to said operating rod from both of said levers.

10. A mechanism according to claim 9 wherein said lower end of said power lever is provided with a cup having an open end facing toward said operating rod, and a plate carried by said operating rod and slidable in said open end of said cup in engagement with said body of material, said means carried by said pedal lever comprising a finger projecting into said cup from the other side thereof.

11. A mechanism according to claim 9 wherein said lower end of said power lever is provided with a cup having an open end facing toward said operating rod, and a plate carried by said operating rod and slidable in said open end of said cup in engagement with said body of material, said means carried by said pedal lever comprising a finger projecting into said cup from the other side thereof, said cup at said other side thereof being provided with an opening through which said finger is slidable, the end of said finger engageable with said body of material being formed as a section of a sphere.

12. A booster brake mechanism comprising a master cylinder operating rod, a fluid pressure motor having a stationary wall, a movable wall and a bellows connecting said walls and forming therewith a motor chamber, a valve mechanism having a normal position connecting said chamber to the atmosphere and movable to an operative position to connect it to a source of vacuum to operate said movable wall, a power lever and a pedal lever pivotally supported intermediate their ends, corresponding ends of said power lever and said pedal lever being connected respectively to said movable wall and to said valve mechanism, means biasing said valve mechanism to said operative position, a spring stronger than said biasing means connected to said pedal lever to tend to hold it in a normal off position in which said valve mechanism is in a normal position, a highly deformable body of material carried by the other end of said power lever and engaging said operating rod and engageable with a portion of said pedal lever upon movement thereof to operate said valve mechanism, said operating rod, a portion of the other end of said power lever and said portion of said pedal lever cooperating to confine said body of material except for a limited expansion space to receive said material deformed thereinto upon operation of said pedal lever, whereby, upon operation of said pedal lever to operate said valve mechanism, forces will be transmitted from both levers through said body of material to said operating rod.

13. A mechanism according to claim 12 wherein said other end of said power lever is provided with a cup substantially in axial alinement with said operating rod and having an open end facing toward said rod, a plate carried by said rod and substantially fitting in said open end of said cup, said portion of said pedal lever comprising a finger projecting into the other end of said cup.

14. A brake operating mechanism comprising a master cylinder operating rod, a fluid pressure motor arranged above said operating rod and having a movable wall at one side of which is formed a variable pressure chamber, a valve mechanism having a normal position connecting said chamber to one source of pressure and movable to connect it to a source of different pressure to operate said movable wall, substantially vertically extending power and pedal levers having upper and lower ends, a fixed pivot pin supporting said levers between said ends thereof, a body of highly deformable material carried by the lower end of said power lever and engaging said operating rod, and an arm pivotally connected at its upper end to said pivot pin and at its lower end to said operating rod adjacent said body of material, one side of said body of material engaging said operating rod, a portion of said pedal lever being engageable with the opposite side of said body of material upon movement of said pedal lever from a normal off position to operate said valve mechanism, whereby forces will be delivered from both of said levers through said body of material to said operating rod.

15. A mechanism according to claim 14 wherein said lower end of said power lever is provided with a cup substantially in axial alinement with said rod and having an open end facing toward said rod, a plate carried by said rod and extending into said open end of said cup in engagement with said body of material, the other side of said cup having a wall provided with an axial opening, said portion of said pedal lever comprising a finger fitting and slidable through said opening and terminating in an end formed as a section of a sphere engageable with said body of material.

References Cited in the file of this patent

UNITED STATES PATENTS

| | | |
|---|---|---|
| 1,468,602 | Loughead | Sept. 18, 1923 |
| 1,846,017 | Albinson | Feb. 23, 1932 |
| 2,791,203 | Ayers | May 7, 1957 |
| 2,799,252 | Ingres | July 16, 1957 |
| 2,805,550 | Ayers | Sept. 10, 1957 |
| 2,828,720 | Ingres | Apr. 1, 1958 |